United States Patent
Nakajima

(10) Patent No.: US 11,279,178 B2
(45) Date of Patent: Mar. 22, 2022

(54) TIRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 414 days.

(21) Appl. No.: 16/242,703

(22) Filed: Jan. 8, 2019

(65) Prior Publication Data

US 2019/0225029 A1 Jul. 25, 2019

(30) Foreign Application Priority Data

Jan. 23, 2018 (JP) .............................. JP2018-008979

(51) Int. Cl.
*B60C 11/13* (2006.01)
*B60C 11/04* (2006.01)

(52) U.S. Cl.
CPC ........ *B60C 11/1353* (2013.01); *B60C 11/047* (2013.01); *B60C 11/13* (2013.01); *B60C 11/1307* (2013.01); *B60C 11/1315* (2013.01); *B60C 11/1323* (2013.01); *B60C 2011/133* (2013.01); *B60C 2011/1338* (2013.01); *B60C 2011/1361* (2013.01)

(58) Field of Classification Search
CPC ........ B60C 11/1353; B60C 2011/1361; B60C 11/13; B60C 11/1307; B60C 11/1315; B60C 11/1323; B60C 2011/133; B60C 2011/1338
See application file for complete search history.

(56) References Cited

U.S. PATENT DOCUMENTS

| | | | | |
|---|---|---|---|---|
| 5,246,049 | A | * | 9/1993 | Ramcke ............... B60C 11/0309 152/209.21 |
| 6,415,835 | B1 | * | 7/2002 | Heinen ............... B60C 11/0309 152/209.21 |
| 2013/0333818 | A1 | * | 12/2013 | Yamaguchi ........... B60C 11/042 152/523 |
| 2018/0290500 | A1 | * | 10/2018 | Yeo ..................... B60C 11/1369 |

FOREIGN PATENT DOCUMENTS

JP      2016-137763 A      8/2016

\* cited by examiner

*Primary Examiner* — Alison L Hindenlang
*Assistant Examiner* — George W. Brady
(74) *Attorney, Agent, or Firm* — Greenblum & Bernstein, P.L.C.

(57) ABSTRACT

A tread portion has a circumferential groove extending continuously and circumferentially. The circumferential groove has a groove bottom and a pair of groove walls radially extending from the groove bottom to a tread surface. The groove bottom includes groove bottom protruding portions protruding radially outwardly from a groove bottom reference surface parallel to the tread surface at a deepest position of a groove depth of the circumferential groove. Each of the groove bottom protruding portions is formed to be symmetrical about a center line of the circumferential groove in a plan view of the tread portion and has a first groove bottom surface extending radially. The first groove bottom surface includes a first surface portion on one side of the center line and a second surface portion on the other side. An angle between the first surface portion and the second surface portion is from 20° to 170°.

21 Claims, 5 Drawing Sheets

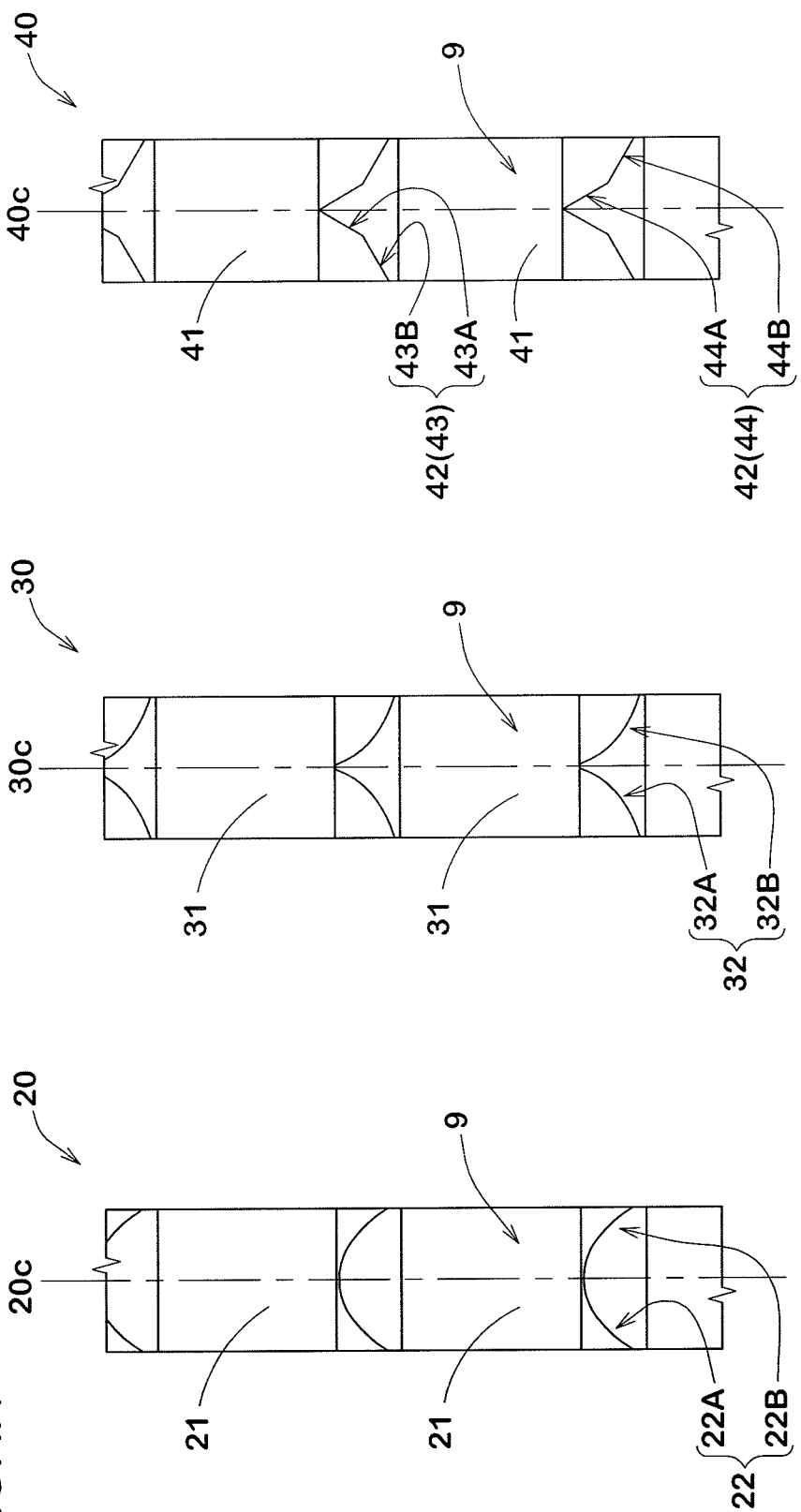

TIRE

TECHNICAL FIELD

The present invention relates to a tyre having a tread portion provided with a circumferential groove extending continuously in a tyre circumferential direction.

BACKGROUND ART

Conventionally, in order to improve on-snow performance, an attempt has been made to specify the shape of groove walls of the circumferential groove extending continuously in the tyre circumferential direction formed in the tread portion. For example, Japanese unexamined Patent Application Publication No. 2016-137763 (Patent Literature 1) has proposed a tyre having improved on-snow performance by providing enlarged width portions in the circumferential grooves.

SUMMARY OF THE INVENTION

However, there has been a case with the tyre disclosed in Patent Literature 1 where drive power and braking force become insufficient during running on a snowy road surface depending on the use situation, therefore, there has been a demand for further improvement to maintain the on-snow performance high.

The present invention was made in view of the above, and a primary object thereof is to provide a tyre capable of improving the on-snow performance by specifying the shape of the circumferential groove.

In one aspect of the present invention, a tyre comprises a tread portion including a tread surface which is to be in contact with a ground during running, wherein the tread portion is provided with a circumferential groove extending continuously in a tyre circumferential direction, the circumferential groove has a groove bottom and a pair of groove walls extending from the groove bottom to the tread surface in a tyre radial direction, the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions is formed to be symmetrical with respect to a center line of the circumferential groove in a plan view of the tread portion and has a first groove bottom surface extending in the tyre radial direction, the first groove bottom surface includes a first surface portion positioned on one side of the center line of the circumferential groove and a second, surface portion positioned on the other side, and an angle between the first surface portion and the second surface portion is in a range of from 20 to 170 degrees in the plan view of the tread portion.

In another aspect of the invention, it is preferred that each of the groove bottom protruding portions has a second groove bottom surface having an angle larger than that of the first groove bottom surface with respect to the tyre radial direction.

In another aspect of the invention, it is preferred that each of the groove bottom protruding portions has a third groove bottom surface substantially parallel to the tread surface and connecting between an outer end in the tyre radial direction of the first groove bottom surface and an outer end in the tyre radial direction of the second groove bottom surface.

In another aspect of the invention, it is preferred that each of the first surface portion and the second surface portion is formed by a curved surface.

In another aspect of the invention, it is preferred that each of the first surface portion and the second surface portion is formed by a flat surface.

In another aspect of the invention, it is preferred that each of the first surface portion and the second surface portion is formed by at least two flat surfaces having different angles with respect to a tyre width direction.

In another aspect of the invention, it is preferred that a height in the tyre radial direction of the first groove bottom surface is not less than 1 mm.

In another aspect of the invention, it is preferred that the first groove bottom surface further includes a third surface portion positioned between the first surface portion and the second surface portion.

In another aspect of the invention, it is preferred that the third surface portion is perpendicular to the center line of the circumferential groove.

In another aspect of the invention, it is preferred that the third surface portion is formed by a curved surface.

In another aspect of the invention, it is preferred that the third surface portion is formed by a flat surface.

In another aspect of the invention, it is preferred that a length in the tyre width direction of the third surface portion is not more than 60% of a maximum distance in the tyre width direction between the first surface portion and the second surface portion.

In another aspect of the invention, it is preferred that the pair of the groove walls extend along the tyre circumferential direction.

The circumferential groove of one aspect of the present invention includes the plurality of the groove bottom protruding portions protruding outwardly in the tyre radial direction from the groove bottom reference surface defined as the surface parallel to the tread surface at the deepest position of the groove depth of the circumferential groove. In the circumferential groove configured as such, the groove bottom protruding portions stick themselves into snow, therefore, it is possible that the on-snow performance is improved.

Each of the groove bottom protruding portions of one aspect of the present invention is formed to be symmetrical with respect to the center line of the circumferential groove in the plan view of the tread portion and has the first groove bottom surface extending in the tyre radial direction, the first groove bottom surface includes the first surface portion positioned on one side of the center line of the circumferential groove and the second surface portion positioned on the other side, and the angle between the first surface portion and the second surface portion is in the range of from 20 to 170 degrees in the plan view of the tread portion.

In the groove bottom protruding portions configured as such, edge components in the tyre width direction is increased, therefore, it is possible that the drive power and the braking force during running on a snowy road surface is improved. Further, with the first groove bottom surface configured as such, snow moves along the first surface portion and the second surface portion, therefore, condensation of the snow is promoted, thereby, it is possible that snow shearing force is improved.

BRIEF DESCRIPTION OF THE DRAWINGS

FIG. 4A is a plan view of the circumferential groove according to another embodiment of the present invention.

FIG. 4B is a plan view of the circumferential groove according to yet another embodiment of the present invention.

FIG. 4C is a plan view of the circumferential groove according to still another embodiment of the present invention.

DESCRIPTION OF THE PREFERRED EMBODIMENT

An embodiment of the present invention will now be described below in detail in conjunction with accompanying drawings.

Figure 1:
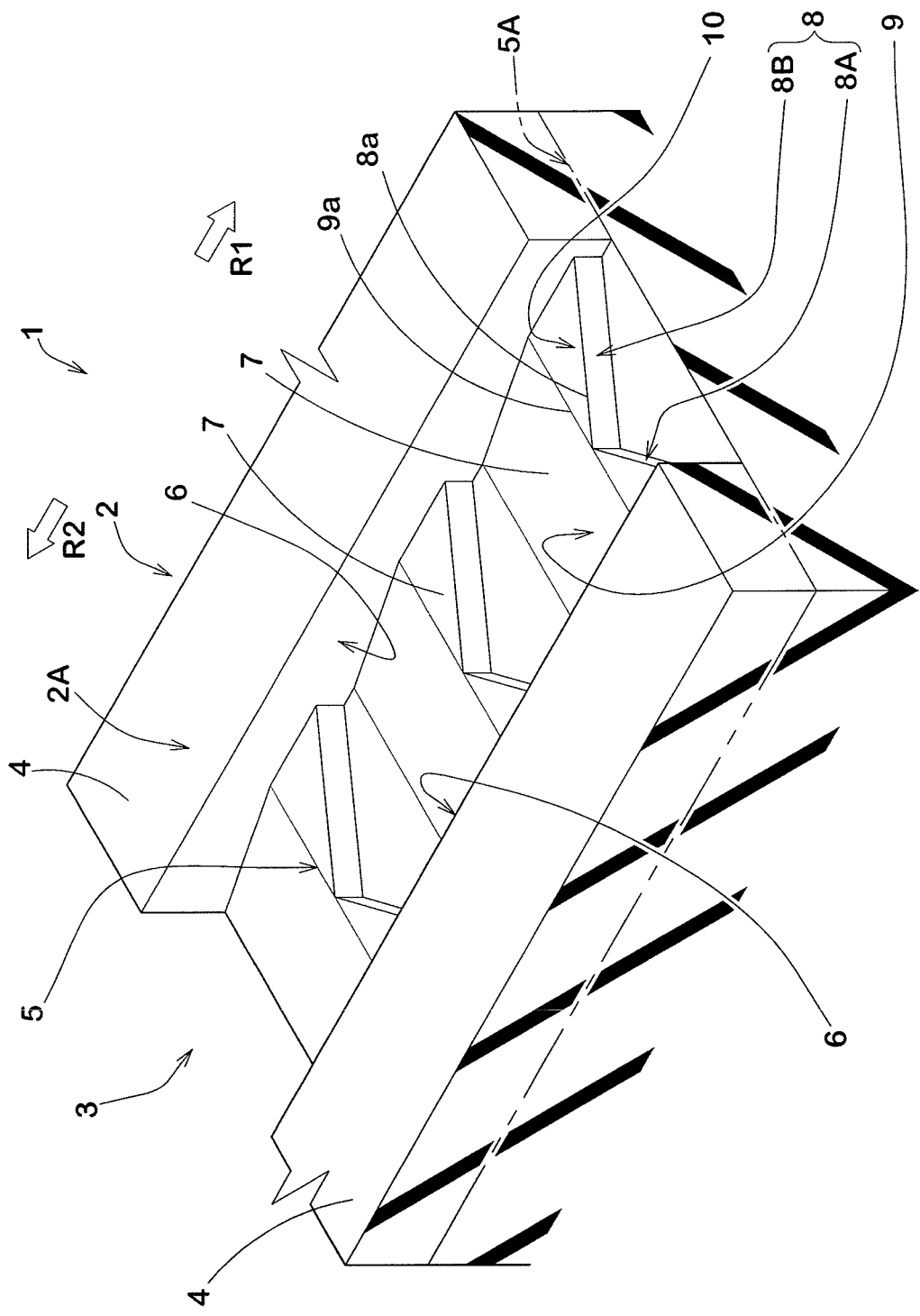
FIG. 1 is a perspective view of a circumferential groove of a tyre according to an embodiment of the present invention.

FIG. 1 is a perspective view of a circumferential groove 3 of a tyre 1 in this embodiment. As shown in FIG. 1, the tyre 1 in this embodiment has a tread portion 2 including a tread surface (2A) which is to be in contact with a road surface during running. The tyre 1 in this embodiment is suitably used as a winter tyre. Here, the winter tyre means a tyre suitable for running on a snowy road surface including a studless tyre, a snow tyre, and an all season tyre.

The tread portion 2 in this embodiment includes at least one circumferential groove 3 extending continuously in the tyre circumferential direction and a plurality of land regions 4 divided by the circumferential groove 3.

Figure 2:
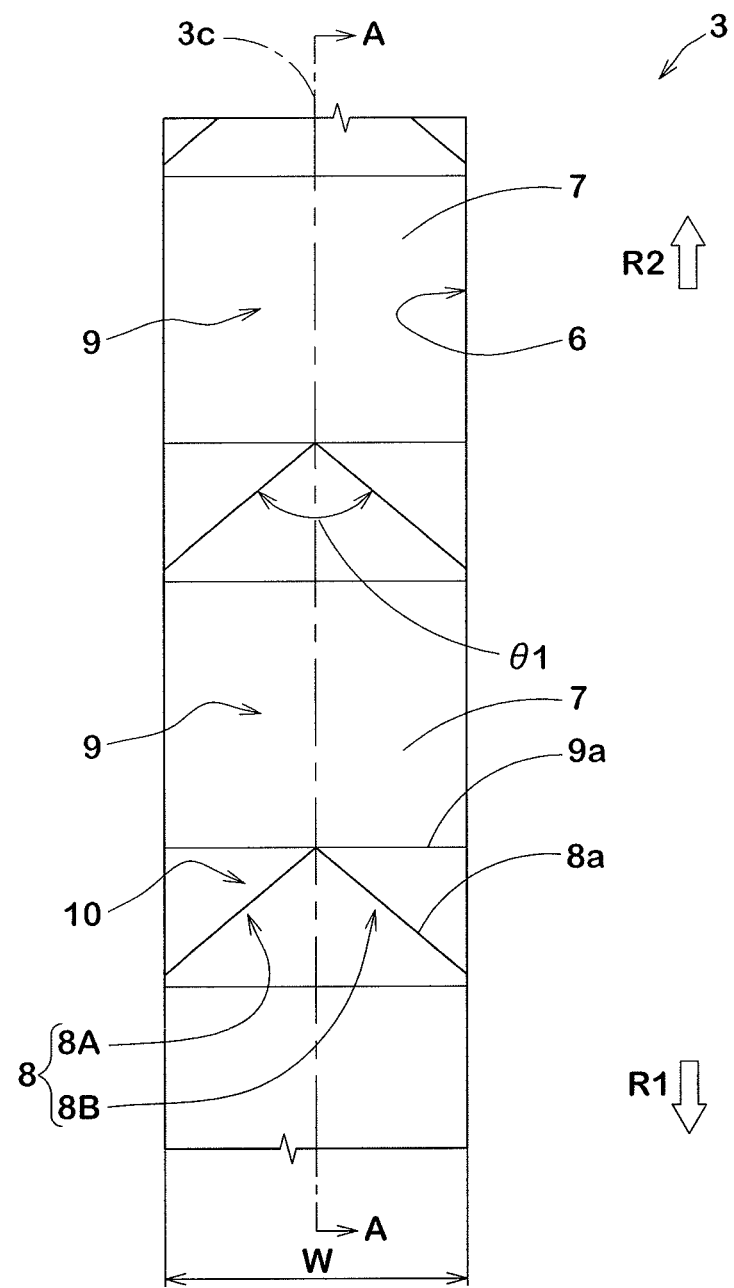
FIG. 2 is a plan view of the circumferential groove of FIG. 1.
Figure 3:
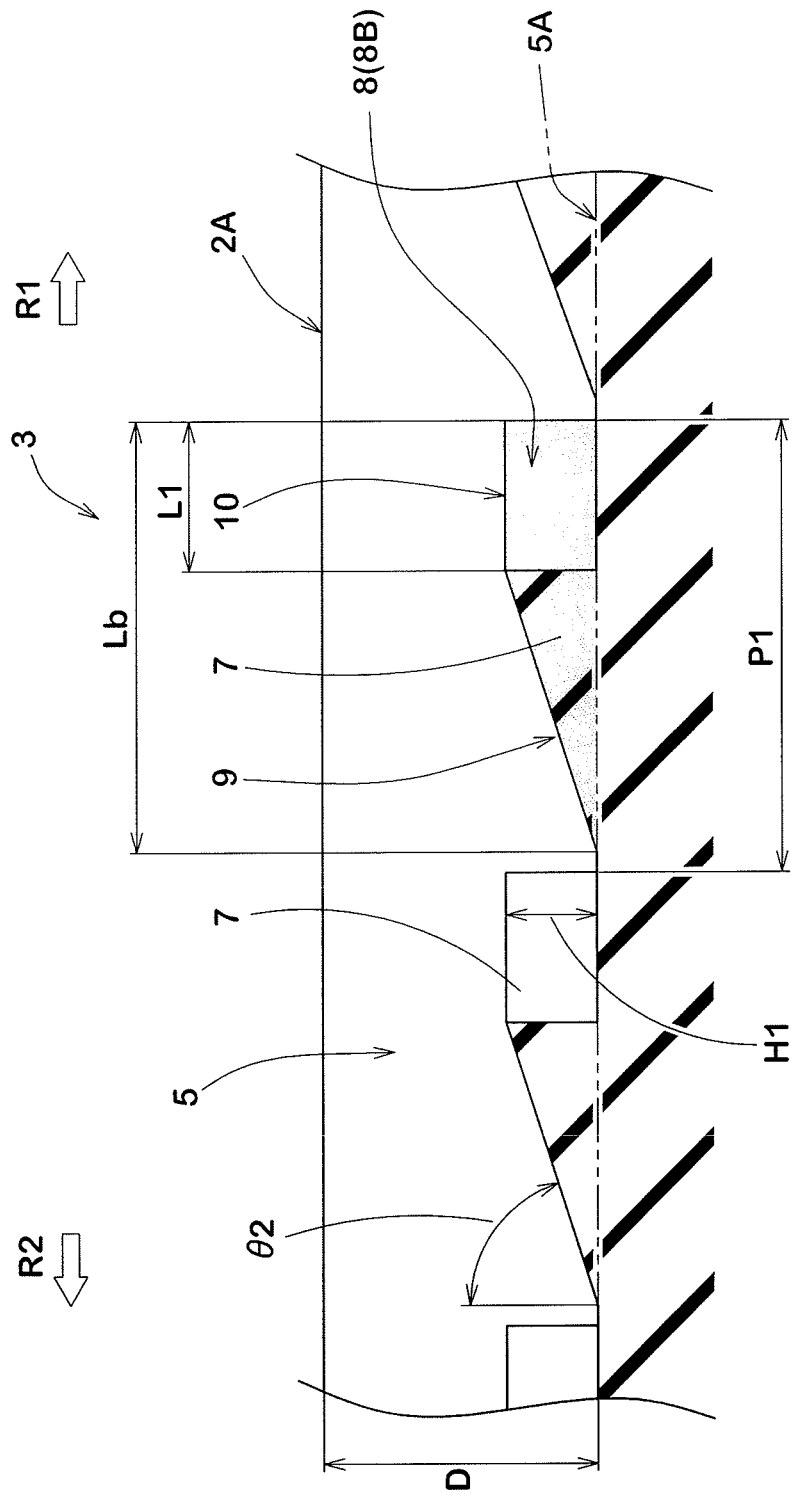
FIG. 3 is a cross-sectional view taken along A-A line of FIG. 2.

FIG. 2 is a plan view of the circumferential groove 3, and FIG. 3 is a cross-sectional view taken along A-A line of FIG. 2. As shown in FIGS. 1 to 3, the circumferential groove 3 in this embodiment has a groove bottom 5 and a pair of groove walls 6 each extending from the groove bottom 5 toward the tread surface (2A) in a tyre radial direction. Here, in this specification, "extending in a direction" means containing a lot of components in that direction.

The groove bottom 5 includes a plurality of groove bottom protruding portions 7 each protruding outwardly in the tyre radial direction from a groove bottom reference surface (5A) defined as a surface parallel to the tread surface (2A) at a deepest position of a groove depth (D) of the circumferential groove 3. In FIG. 3, for ease of understanding, one of the groove bottom protruding portions 7 is shaded.

In the circumferential groove 3 configured as such, the groove bottom protruding portions 7 stick themselves into snow even when the tyre 1 is worn, therefore, it is possible that excellent on-snow performance is maintained. Further, the groove bottom protruding portions 7 configured as such disturb vibration in an air column of the circumferential groove 3, therefore, it is possible that air column resonance sound during running is decreased, thereby, it is possible that noise performance of the tyre 1 is improved.

Each of the groove bottom protruding portions 7 in this embodiment has a first groove bottom surface 8 extending in the tyre radial direction.

As shown in FIG. 2, it is preferred that each of the first groove bottom surfaces 8 is formed to be symmetrical with respect to a center line (3c) of the circumferential groove 3 in a plan view of the tread portion. Each of the first groove bottom surfaces 8 in this embodiment includes a first surface portion (8A) positioned on one side of the center line (3c) of the circumferential groove 3 and a second surface portion (8B) positioned on the other side. It is preferred that an angle θ1 between the first surface portion (8A) and the second surface portion (8B) in the plan view of the tread portion is in the range of from 20 to 170 degrees in each of the first groove bottom surfaces 8. With the groove bottom protruding portions 7 configured as such, when the tyre 1 is rotated in a first rotational direction (R1) in which an opening side of the groove bottom protruding portions 7 is a heel side, snow moves along the first surface portions (8A) and the second surface portions (8B), therefore, condensation of the snow is promoted, thereby, it is possible that snow shearing force is improved even when the tyre 1 is worn. The opening side of each of the groove bottom protruding portions 7 is a wider side between the first surface portions (8A) and the second surface portions (8B).

It is possible that the tyre 1 having the circumferential groove 3 described above maintains good on-snow performance by specifying the shapes of the groove bottoms 5 regardless of whether the tyre 1 is worn or not worn. More preferred shapes of the groove bottoms 5 will be described below.

As shown in FIGS. 1 and 2, the center line (3c) in a groove width direction of the circumferential groove 3 extends along the tyre circumferential direction. Here, in this specification, the expression "along a direction" means "parallel to the direction".

It is preferred that the groove bottom protruding portions 7 are formed over the entire width in a tyre width direction of the circumferential groove 3. Each of the first surface portions (8A) and the second surface portions (8B) in this embodiment is formed by a flat surface.

As shown in FIG. 3, it is preferred that a height (H1) in the tyre radial direction of each of the first groove bottom surfaces 8 is not less than 1 mm. Further, it is preferred that the height (H1) of each of the first groove bottom surfaces 8 is smaller than a height, from the groove bottom reference surface (5A), of a tread wear indicator (not shown) indicating a wear limit of the tyre 1. In the groove bottom protruding portions 7 having the first groove bottom surfaces 8 configured as such, the first groove bottom surfaces 8 certainly stick themselves into the snow even when the tyre 1 is used up to the wear limit, therefore, it is possible that good on-snow performance is maintained.

It is preferred that an interval (P1) between the first groove bottom surfaces 8 adjacent to each other in the tyre circumferential direction is in the range of from 10 to 15 mm. In the groove bottom protruding portions 7 having the first groove bottom surfaces 8 configured as such, the first groove bottom surfaces 8 appropriately stick themselves into the snow, therefore, it is possible that the on-snow performance is improved.

Each of the groove bottom protruding portions 7 has a second groove bottom surface 9 having an angle with respect to the tyre radial direction larger than that of each of the first groove bottom surfaces 8, for example. Each of the groove bottom protruding portions 7 in this embodiment further has a third groove bottom surface 10 substantially parallel to the tread surface (2A) and connecting between an outer end (8a) in the tyre radial direction of a respective one of the first groove bottom surfaces 8 and an outer end (9a) in the tyre radial direction of a respective one of the second groove bottom surfaces 9. In this specification, the expression "substantially parallel" includes precisely parallel and inclined at an angle within ±5 degrees with respect to parallel.

It is preferred that each of the second groove bottom surfaces 9 has an angle θ2 in the range of from 70 to 87 degrees with respect to the tyre radial direction. With the second groove bottom surfaces 9 configured as such, when the tyre 1 is rotated in a second rotational direction (R2), snow moves along the second groove bottom surfaces 9, therefore, the condensation of the snow is promoted, thereby, it is possible that the snow shearing force is improved.

It is preferred that a length (L1) in the tyre circumferential direction of each of the third groove bottom surfaces 10 is not less than 10% of a length (Lb) in the tyre circumferential direction of each of the groove bottom protruding portions 7. With the third groove bottom surfaces 10 configured as such, the condensation of the snow is promoted, thereby, it is possible that the snow shearing force is improved and that strength of the groove bottom protruding portions 7 is increased.

The length (Lb) in the tyre circumferential direction of each of the groove bottom protruding portions 7 in this embodiment is smaller than the interval (P1) between the first groove bottom surfaces 8 adjacent to each other in the tyre circumferential direction. Note that the length (Lb) of each of the groove bottom protruding portions 7 may be substantially equal to the interval (P1) between the first groove bottom surfaces 8 adjacent to each other in the tyre circumferential direction.

As shown in FIGS. 1 and 2, the pair of the groove walls 6 in this embodiment has a predetermined groove width (W) and extends along the tyre circumferential direction. By the circumferential groove 3 configured as such, it is possible that steering stability on a dry road surface is improved.

FIGS. 4A, 4B, and 4C are plan views of circumferential grooves 20, 30, and 40, respectively, according to other embodiments. The same reference numerals are given to the elements common to the embodiment described above, and the explanations thereof are omitted.

FIG. 4A shows the circumferential groove 20 in which each of first groove bottom surfaces 22 of groove bottom protruding portions 21 is formed by a curved surface. As shown in FIG. 4A, the circumferential groove 20 in this embodiment includes a plurality of the groove bottom protruding portions 21. Each of the groove bottom protruding portions 21 in this embodiment has one of the first groove bottom surfaces 22 extending in the tyre radial direction and its adjacent one of the second groove bottom surfaces 9 having an angle larger than that of the first groove bottom surface 22 with respect to the tyre radial direction.

Each of the first groove bottom surfaces 22 includes a first surface portion (22A) positioned on one side of a center line (20c) of the circumferential groove 20 and a second surface portion (22B) positioned on the other side, for example. Each of the first surface portions (22A) and the second surface portions (22B) in this embodiment is formed by a curved surface concave toward a respective one of the second groove bottom surfaces 9. With the groove bottom protruding portions 21 configured as such, it is possible that the snow is condensed along the curved surfaces of the first groove bottom surfaces 22, therefore, it is possible that the snow shearing force is improved.

FIG. 4B shows the circumferential groove 30 in which each of first groove bottom surfaces 32 of groove bottom protruding portions 31 is formed by a curved surface. As shown in FIG. 4B, the circumferential groove 30 in this embodiment includes a plurality of the groove bottom protruding portions 31. Each of the groove bottom protruding portions 31 in this embodiment has one of the first groove bottom surfaces 32 extending in the tyre radial direction and its adjacent one of the second groove bottom surfaces 9 having an angle larger than that of the first groove bottom surface 32 with respect to the tyre radial direction.

Each of the first groove bottom surfaces 32 includes a first surface portion (32A) positioned on one side of a center line (30c) of the circumferential groove 30 and a second surface portion (32B) positioned on the other side, for example. Each of the first surface portions (32A) and the second surface portions (32B) in this embodiment is formed by a curved surface convex toward a direction opposite to a respective one of the second groove bottom surfaces 9. With the groove bottom protruding portions 31 configured as such, it is possible that the snow is condensed along the curved surfaces of the first groove bottom surfaces 32, therefore, it is possible that the snow shearing force is improved.

FIG. 4c shows the circumferential groove 40 in which each of first groove bottom surfaces 42 of groove bottom protruding portions 41 is formed by two flat surfaces having different angles from each other with respect to the tyre width direction. As shown in FIG. 4c, the circumferential groove 40 in this embodiment includes a plurality of the groove bottom protruding portions 41. Each of the groove bottom protruding portions 41 in this embodiment has one of the first groove bottom surfaces 42 extending in the tyre radial direction.

Each of the first groove bottom surfaces 42 includes a first surface portion 43 positioned on one side of a center line (40c) of the circumferential groove 40 and a second surface portion 44 positioned on the other side, for example. It is preferred that each of the first surface portion 43 and the second surface portion 44 is formed by at least two flat surfaces, two flat surfaces in this embodiment, having different angles with respect to the tyre width direction.

The first surface portion 43 includes an inner first surface portion (43A) positioned on a side of the center line (40c) of the circumferential groove 40 and an outer first surface portion (43B) positioned on an outer side of the inner first surface portion (43A) and having a smaller angle than that of the inner first surface portion (43A) with respect to the tyre width direction, for example. Although not shown in the figure, the angle of the outer first surface portion (43B) with respect to the tyre width direction may be larger than the angle of the inner first surface portion (43A) with respect to the tyre width direction.

The second surface portion 44 includes an inner second surface portion (44A) positioned on the side of the center line (40c) of the circumferential groove 40 and an outer second surface portion (44B) positioned on the outer side of the inner second surface portion (44A) and having a smaller angle than that of the inner second surface portion (44A) with respect to the tyre width direction, for example. Although not shown in the figure, the angle of the outer second surface portion (44B) with respect to the tyre width direction may be larger than the angle of the inner second surface portion (44A) with respect to the tyre width direction.

With the groove bottom protruding portions 41 configured as such, it is possible that the snow is condensed along the outer first surface portions (43B) and the inner first surface portions (43A) of the first groove bottom surfaces 42 and the outer second surface portions (44B) and the inner second surface portions (44A), therefore, it is possible that the snow shearing force is improved.

Figure 5A:
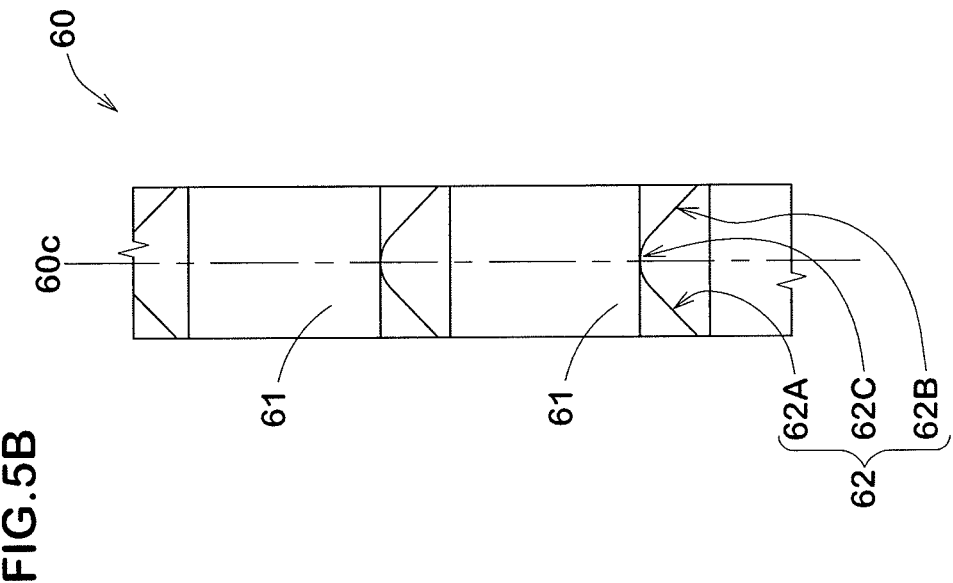
FIG. 5A is a plan view of the circumferential groove according to further another embodiment of the present invention.
Figure 5B:
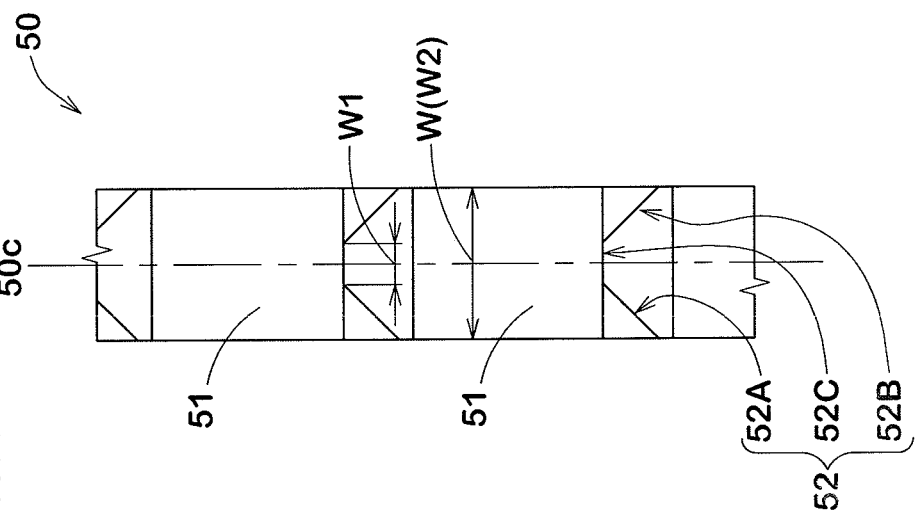
FIG. 5B is a plan view of the circumferential groove according to yet further another embodiment of the present invention.

FIGS. 5A and 5B are plan views of circumferential grooves 50 and 60 according to further other embodiments, respectively. The same reference numerals are given to the elements common to the embodiments described above, and the explanations thereof are omitted.

FIG. 5A shows the circumferential groove 50 in which a first groove bottom surface 52 of each of groove bottom protruding portions 51 includes a third surface portion (52C). As shown in FIG. 5A, the circumferential groove 50 in this embodiment includes a plurality of the groove bottom protruding portions 51. Each of the groove bottom protruding portions 51 in this embodiment has the first groove bottom surface 52 extending in the tyre radial direction.

Each of the first groove bottom surfaces 52 includes a first surface portion (52A) positioned on one side of a center line (50c) of the circumferential groove 50, a second surface portion (52B) positioned on the other side, and the third surface portion (52c) positioned between the first surface portion (52A) and the second surface portion (52B), for example. The third surface portion (52C) is perpendicular to the center line (50c), for example. Each of the first surface portion (52A), the second surface portion (52B), and the third surface portion (52C) is formed by a flat surface.

It is preferred that a length (w1) in the tyre width direction of the third surface portion (52C) is not more than 60% of a maximum distance (w2) in the tyre width direction between the first surface portion (52A) and the second surface portion (52B). The maximum distance (W2) between the first surface portion (52A) and the second surface portion (52B) in this embodiment is substantially equal to the groove width (W) of the circumferential groove 50. With the groove bottom protruding portions 51 configured as such, the snow is condensed along the first surface portions (52A) and the second surface portions (52B) and edge components in the tyre width direction are increased by the third surface portions (52C), therefore, it is possible that the on-snow performance is improved. Note that the maximum distance (w2) between the first surface portion (52A) and the second surface portion (52B) may be smaller than the groove width (w).

FIG. 5B shows the circumferential groove 60 in which a first groove bottom surface 62 of each of groove bottom protruding portions 61 includes a third surface portion (62C). As shown in FIG. 5B, the circumferential groove 60 in this embodiment includes a plurality of the groove bottom protruding portions 61. Each of the groove bottom protruding portions 61 in this embodiment has the first groove bottom surface 62 extending in the tyre radial direction.

Each of the first groove bottom surfaces 62 includes a first surface portion (62A) positioned on one side of a center line (60c) of the circumferential groove 60, a second surface portion (62B) positioned on the other side, and the third surface portion (62C) positioned between the first surface portion (62A) and the second surface portion (62B), for example.

Each of the first surface portions (62A) and the second surface portions (62B) in this embodiment is formed by a flat surface. Further, the third surface portion (62c) in this embodiment is formed by a curved surface. It is preferred that the first surface portions (62A) and the third surface portion (62C) are connected smoothly. Furthermore, it is preferred that the second surface portion (62B) and the third surface portion (62C) are connected smoothly.

With the groove bottom protruding portions 61 configured as such, the snow is condensed along the first surface portions (62A) and the second surface portions (62B) and the edge components in the tyre width direction are increased by the third surface portions (62C), therefore, it is possible that the on-snow performance is improved. Note that each of the third surface portions (62C) may be configured by a combination of a curved surface and a flat surface.

While detailed description has been made of the tyres as especially preferred embodiments of the present invention, the present invention can be embodied in various forms without being limited to the illustrated embodiments.

Working Examples (Examples)

Tyres as Examples provided with the circumferential groove(s) having the groove bottom protruding portions shown in FIG. 1 and tyres as conventional Example provided with the circumferential groove(s) not having the groove bottom protruding portions were made by way of test. These test tyres (unused) and the test tyres worn up to 50% of the wear limit were respectively mounted on a test car, and then they were tested for driving performance and braking performance during running on a snowy road surface. Regarding the Examples, the tyres as Example 1 were tested such that they were rotated in a direction in which the opening sides of the groove bottom protruding portions were the heel side, and the tyres as Example 2 were tested such that they were rotated in the opposite direction. Common specifications of each of the test tyres and the test methods were as follows.

Test car: mid-size passenger car
Tyre size: 255/55R17
Tyre rim size: 17×7J
Tyre inner pressure: 230 kPa <Driving Performance and Driving Performance when Worn>

While the test car with the test tyres mounted on all wheels thereof was driven on a road covered with compacted snow, the driving performance was evaluated by feeling of the driver having the evaluation skills. The results are indicated by an index each based on the conventional Example being 100, wherein the larger the numerical value, the better the driving performance is.

<Braking Performance and Braking Performance when Worn>

While the test car with the test tyres mounted on all the wheels thereof was driven on a road covered with compacted snow, the braking performance was evaluated by the feeling of the driver having the evaluation skills. The results are indicated by an index each based on the Conventional Example being 100, wherein the larger the numerical value, the better the braking performance is.

<Noise Performance>

In-car noise was measured by using a microphone while the test car with the test tyres mounted on all the wheels thereof was driven on a road for measuring road noise at a speed of 80 km/h. The in-car noise was measured in the vicinity of the position of the driver's ear on the window side and the sound pressure level of the peak value in the narrow band around 1 KHz was evaluated. The results are indicated by an index each based on the Conventional Example being 100, wherein the smaller the numerical value, the better the noise performance is.

The test results are shown in Table 1.

TABLE 1

|  | Conventional Example | Example 1 | Example 2 |
|---|---|---|---|
| Driving performance [index] | 100 | 105 | 104 |
| Braking performance [index] | 100 | 106 | 103 |
| Driving performance when worn [index] | 100 | 107 | 105 |
| Braking performance when worn [index] | 100 | 107 | 105 |
| Noise performance [index] | 100 | 97 | 97 |

From the test results, as compared with the conventional Example, it was confirmed that the tyres as the Examples were excellent in the driving performance and the braking performance during running on a snowy road surface and that they maintained good on-snow performance even when the tyres were worn.

The invention claimed is:

1. A tyre comprising a tread portion including a tread surface which is to be in contact with a ground during running, wherein
the tread portion is provided with a circumferential groove extending continuously in a tyre circumferential direction,
the circumferential groove has a groove bottom and a pair of groove walls extending from the groove bottom to the tread surface in a tyre radial direction,
the groove bottom includes a plurality of groove bottom protruding portions protruding outwardly in the tyre radial direction from a groove bottom reference surface defined as a surface parallel to the tread surface at a deepest position of a groove depth of the circumferential groove,
each of the groove bottom protruding portions is formed to be symmetrical with respect to a width-wise center line of the circumferential groove in a plan view of the tread portion and has a first groove bottom surface extending in the tyre radial direction,
the first groove bottom surface includes a first surface portion positioned on one side in a width direction of the circumferential groove of the width-wise center line of the circumferential groove and a second surface portion positioned on the other side in the width direction, and
an angle between the first surface portion and the second surface portion is in a range of from 20 to 170 degrees in the plan view of the tread portion, wherein the plan view is a view along the tyre radial direction,
wherein the groove bottom protruding portions are each formed over an entire width in a tyre width direction of the circumferential groove.

2. The tyre according to claim 1, wherein
each of the groove bottom protruding portions has a second groove bottom surface having an angle larger than that of the first groove bottom surface with respect to the tyre radial direction.

3. The tyre according to claim 2, wherein
each of the groove bottom protruding portions has a third groove bottom surface substantially parallel to the tread surface and connecting between an outer end in the tyre radial direction of the first groove bottom surface and an outer end in the tyre radial direction of the second groove bottom surface.

4. The tyre according to claim 3, wherein
a length in the tyre circumferential direction of each of the third groove bottom surfaces is not less than 10% of a length in the tyre circumferential direction of each of the groove bottom protruding portions.

5. The tyre according to claim 2, wherein
the second groove bottom surface is formed by a flat surface.

6. The tyre according to claim 1, wherein
each of the first surface portion and the second surface portion is formed by a curved surface.

7. The tyre according to claim 1, wherein
each of the first surface portion and the second surface portion is formed by a flat surface.

8. The tyre according to claim 1, wherein
each of the first surface portion and the second surface portion is formed by at least two flat surfaces having different angles with respect to a tyre width direction.

9. The tyre according to claim 1, wherein
a height in the tyre radial direction of the first groove bottom surface is not less than 1 mm.

10. The tyre according to claim 1, wherein
the first groove bottom surface further includes a third surface portion positioned between the first surface portion and the second surface portion.

11. The tyre according to claim 10, wherein
the third surface portion is perpendicular to the center line of the circumferential groove.

12. The tyre according to claim 10, wherein
the third surface portion is formed by a curved surface.

13. The tyre according to claim 10, wherein
the third surface portion is formed by a flat surface.

14. The tyre according to claim 10, wherein
a length in a tyre width direction of the third surface portion is not more than 60% of a maximum distance in the tyre width direction between the first surface portion and the second surface portion.

15. The tyre according to claim 1, wherein
the pair of the groove walls extend along the tyre circumferential direction.

16. The tyre according to claim 1, wherein
each of the groove bottom protruding portions has a second groove bottom surface having an angle larger than that of the first groove bottom surface with respect to the tyre radial direction, and
in the plan view of the tread portion, the first surface portion and the second surface portion are inclined to an opposite side to each other with respect to the width direction such that they approach the second groove bottom surface as it goes from the respective groove wall toward the center line.

17. The tyre according to claim 1, wherein
an interval between the first groove bottom surfaces adjacent to each other in the tyre circumferential direction is in the range of from 10 to 15 mm.

18. The tyre according to claim 1, wherein
a length in the tyre circumferential direction of each of the groove bottom protruding portions is smaller than an interval between the first groove bottom surfaces adjacent to each other in the tyre circumferential direction.

19. The tyre according to claim 1, wherein
a maximum distance between the first surface portion and the second surface portion is smaller than a groove width.

20. A tyre comprising a tread portion including a tread surface which is to be in contact with a ground during running, wherein the tread portion is provided with a circumferential groove extending continuously in a tyre circumferential direction, the circumferential groove has a groove bottom and a pair of groove walls extending from the groove bottom to the tread surface in a tyre radial direction, the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions is formed to be symmetrical with respect to a width-wise center line of the circumferential groove in a plan view of the tread portion and has a first groove bottom surface extending in the tyre radial direction, the first groove bottom surface includes a first surface portion positioned on one side in a width direction of the circumferential groove of the width-wise center line of the circumferential groove and a second surface portion positioned on the other side in the width direction, and an angle between the first surface portion and the second surface portion is in a range of from 20 to 170 degrees in the plan view of the tread portion, wherein the plan view is a view along the tyre radial direction.

21. A tyre comprising a tread portion including a tread surface which is to be in contact with a ground during running, wherein the tread portion is provided with a circumferential groove extending continuously in a tyre circumferential direction, the circumferential groove has a groove bottom and a pair of groove walls extending from the groove bottom to the tread surface in a tyre radial direction, the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions is formed to be symmetrical with respect to a width-wise center line of the circumferential groove in a plan view of the tread portion and has a first groove bottom surface extending in the tyre radial direction, the first groove bottom surface includes a first surface portion positioned on one side in a width direction of the circumferential groove of the width-wise center line of the circumferential groove and a second surface portion positioned on the other side in the width direction, and an angle between the first surface portion and the second surface portion is in a range of from 20 to 170 degrees in the plan view of the tread portion, wherein the plan view is a view along the tyre radial direction, wherein each of the groove bottom protruding portions has a second groove bottom surface having an angle larger than that of the first groove bottom surface with respect to the tyre radial direction, and wherein each of the groove bottom protruding portions has a third groove bottom surface substantially parallel to the tread surface and connecting between an outer end in the tyre radial direction of the first groove bottom surface and an outer end in the tyre radial direction of the second groove bottom surface.

* * * * *